United States Patent Office 2,797,187
Patented June 25, 1957

2,797,187

PRODUCTION OF PUROMYCIN

Stephen Aloysius Szumski, Pearl River, N. Y., and Joseph Jacob Goodman, Nanuet, N. J., assignors to American Cyanamid Company, New York, N. Y., a corporation of Maine No Drawing. Application September 29, 1955,
Serial No. 537,572

10 Claims. (Cl. 195—80)

This invention relates to an improved process for the manufacture of puromycin and to a fermentation medium therefor.

Puromycin, an antibiotic produced by a new species of actinomycete, *Streptomyces albo-niger*, ATCC, 12, 462, has the ability to inhibit both Gram-positive and Gram-negative bacteria and is also active in vivo against species of the protozoan genus Trypanosoma. The physical characteristics of puromycin are described by Porter et al. in Antibiotics and Chemotherapy, 2, 409 (1952). Puromycin has been shown to have the structure 6-dimethylamino - 9 - [3 - (p - methoxy - L - β - phenylalanylamino) - 3-deoxy-β-D-ribofuranosyl]purine [Waller et al., J. A. C. S. 75, 2025 (1953)].

A fermentation process for producing puromycin comprising propagating *S. albo-niger* in an aqueous nutrient medium under controlled temperature and pH conditions is described and claimed in the copending application of Porter et al., Serial No. 254,354, filed November 1, 1951, now U. S. Patent No. 2,763,642, issued September 18, 1956.

In accordance with the present invention, we have now discovered that if the fermentation medium in which the microorganism *S. albo-niger* is grown, is modified to include a small amount of a compound containing the purinyl radical, such as uric acid, for example, as hereinafter more particularly described, the yield of the antibiotic so produced is greatly increased. Thus, for example, we have found that under the fermentation conditions ordinarily used for producing puromycin, the yield is of the order of about 267 gammas per milliliter of medium. When uric acid, for example, is added to the medium, however, a yield of as high as 642 gammas per milliliter has been obtained. Thus, in accordance with our improved process, we have found that it is possible to increase the yield of the antibiotic by the fermentation process by as much as 160%.

The process by which the antibiotic is produced in accordance with the present invention is preferably an aerobic fermentation of an aqueous nutrient medium inoculated with the organism *S. albo-niger*. The constituents of the fermentation medium and the conditions of the fermentation may be generally those of other fermentation processes in which fungi are employed to produce antibiotics, but, preferably are like those described in the copending Porter et al. application, with the important exception that the medium is modified to include a compound containing the purinyl radical.

Sources of carbon in the fermentation medium include starch, hydrolyzed starch, sugars such as lactose, maltose, dextrose, sucrose, or sugar sources such as molasses; alcohols, such as glycerol and mannitol; organic acids, such as citric acid and acetic acid; and various natural products which may contain in addition to carbonaceous substances various other nutrient materials. Nitrogen sources include proteins, such as casein, zein, lactalbumin; protein hydrolyzates, proteoses, peptones, peptides, and commercially available materials, such as N-Z Amine which is understood to be a casein hydrolyzate; also corn steep liquor, soy bean meal, gluten, cotton seed meal, fish meal, meat extracts, stick liquor, liver cake, yeast extracts, distillers' solubles, and the like; amino acids, urea, ammonium and nitrate salts, and so forth. Inorganic cations, such as sodium, potassium, calcium, magnesium, and so forth; and anions, such as the chloride, sulfate, phosphate, and various combinations of these anions and cations in the form of mineral salts are advantageously used in the fermentation, the so-called trace elements, such as boron, cobalt, iron, copper, zinc, manganese, chromium, molybdenum, and still others may be used to advantage. Generally sulfur and the trace elements occur in sufficient quantities in the carbonaceous and nitrogenous constituents of the medium, particularly if they are derived from natural sources, or in the tap water, and the addition of further quantities of these may be unnecessary.

The fermentation mixture is aerated in the customary manner by forcing sterile air through the fermenting mixture usually at the rate of about 1 volume of air per volume of fermentation medium per minute. To minimize contamination with foreign microorganisms, the fermentation vessel should be closed and a pressure of 2–15 pounds above atmospheric pressure maintained in the vessel. Mechanical agitation, in addition to the agitation provided by the aeration, is generally advisable. Anti-foaming agents, such as 1 percent octadecanol in lard oil, may be added from time to time as required to prevent excessive foaming.

As described in the Porter et al. copending application, the pH of the fermentation media is generally around 4.5 to 6.0 at the beginning of the fermentation, but as the fermentation continues the pH tends to rise to as high as 9.0 at the end of the fermentation. The preferred temperature of the fermentation process is about 26° C. to 28° C., although temperatures as low as about 20° C. or as high as 37° C. may be used. Maximum yield is generally obtained within 50 to 80 hours of fermentation at optimum conditions.

To the fermentation medium, and preferably at the start of the fermentation process, there is added a small amount, of the order of from .01–.5% by weight, of a purinyl compound such as uric acid or other analogous material or natural product containing uric acid. Thus, guano, a natural product which contains about 25% uric acid may be used to advantage as it is one of the best sources of uric acid. Also since uric acid is the chief product of nitrogen metabolism by certain animals, such as birds and reptiles, similar excrements may be used. In addition, we may also use to advantage compounds related to uric acid such as the purines, and particularly the amino and hydroxy derivatives of purine such as adenine, hypoxanthine, guanine, xanthine, etc.

The term "purinyl radical" as used throughout the specification and claims is intended to include all such similar compounds exemplified by the above specifically named compounds and materials.

After the fermentation process is complete, the antibiotic may be recovered from the fermentation liquor in a manner similar to that employed in recovering other antibiotics from fermentation liquors. A particularly useful method is described in the aforesaid copending Porter et al. application and which, briefly, involves extracting the activity from the fermentation liquor by the use of a water-immiscible solvent such as n-butanol, pentanol, ethyl acetate, ethyl methyl ketone and the like. The antibiotic substance is preferably first adsorbed on an adsorbent such as activated charcoal, diatomaceous earth, magnesium silicate, etc. and the activity eluted therefrom by the use of a solvent as described. The adsorption and elution steps may be carried out in various ways familiar to those skilled in the art. The antibiotic may be obtained from the solvent extract by precipitating the hydrochloride salt thereof, and the free base may be prepared in crystalline form by treatment of the hydrochloride salt with any of the common alkalies such as sodium hydroxide.

The invention will be described in greater detail in conjunction with the following specific examples.

*Example 1*

A fermentation medium having the following composition:

| | Grams |
|---|---|
| Corn steep liquor (50% solids) | 60 |
| Corn starch | 40 |
| Calcium carbonate | 7 |
| Lard oil | 10 | was made up to 1,000 milliliters with water. The medium was sterilized by steam and then inoculated with 40 milliliters of a culture of *S. albo-niger*. The mixture was fermented for 88 hours at 26° C. to 27° C. and with a pH of 6.0 to 8.5. At the end of the fermentation period the mash was adjusted to a pH of 1.5 with sulfuric acid and 10–15 gm. of diatomaceous earth filter aid was added. The mash was filtered and adjusted to a pH of 9.0–9.5 with sodium hydroxide. The filtrate was extracted with ⅓ filtrate volume of butanol. The butanol extract was acidified and the activity extracted therefrom into water. The aqueous extract was concentrated in vacuo and the crude antibiotic crystals were crystallized therefrom and purfied by recrystallization. Three runs were made using this fermentation medium as the control and the runs yielded an average of 267 gammas of puromycin per milliliter of medium.

*Example 2*

The procedure of the preceding example was repeated with the sole exception that 1 gram per liter of uric acid was added to three separate runs of the fermentation medium. The yield of puromycin from the three runs averaged 478 gammas per milliliter.

*Example 3*

The effect of the uric acid level in the fermentation medium was shown in a series of runs using the same fermentation medium and procedure as described above to be as follows:

| Level g./l. | Potency, $\gamma$/ml. |
|---|---|
| 0 | 252 |
| 0.5 | 335 |
| 1.0 | 556 |
| 1.5 | 490 |
| 2.0 | 479 |

*Example 4*

The procedure of Example 2 was repeated except that 20–40 ml. per liter of a 12.5% sodium hydroxide extract of guano was added to the fermentation medium. Substantially similar yields of puromycin were obtained. Substantially similar yields were also obtained when equivalent quantities of adenine, xanthine, and hypoxanthine were substituted, respectively, for the uric acid used in Example 2.

We claim:

1. A method for the production of puromycin which comprises the steps of propagating the microorganism *Streptomyces albo-niger* under aerobic conditions in an aqueous nutrient solution containing from about .01% to about .5% of a compound containing the purinyl radical until substantial antimicrobial activity is imparted to the solution.

2. A process according to claim 1 in which the compound containing the purinyl radical is uric acid.

3. A process according to claim 1 in which the compound containing the purinyl radical is adenine.

4. A process according to claim 1 in which the compound containing the purinyl radical is hypoxanthine.

5. A process according to claim 1 in which the compound containing the purinyl radical is xanthine.

6. A method for the production of puromycin which comprises the steps of propagating the microorganism *Streptomyces albo-niger* under aerobic conditions in an aqueous nutrient medium containing assimilable carbonaceous and nitrogenous substances and mineral salts essential for growth of the organism and containing from about .01% to about .5% of a compound containing the purinyl radical until substantial antimicrobial activity is imparted to the medium, and thereafter recovering the so-produced puromycin from the fermentation broth.

7. A process according to claim 6 in which the compound containing the purinyl radical is uric acid.

8. A process according to claim 6 in which the compound containing the purinyl radical is adenine.

9. A process according to claim 6 in which the compound containing the purinyl radical is hypoxanthine.

10. A process according to claim 6 in which the compound containing the purinyl radical is xanthine.

References Cited in the file of this patent

UNITED STATES PATENTS 2,741,575  Keil et al. _____ Apr. 10, 1956

OTHER REFERENCES

Porter: Bacterial Chemistry and Physiology, Wile, New York, 1946, pages 707, 754–755, 847.